(12) United States Patent
Fukuhara et al.

(10) Patent No.: US 9,473,793 B2
(45) Date of Patent: Oct. 18, 2016

(54) IMAGE PROCESSING APPARATUS, METHOD, AND PROGRAM

(71) Applicants: Sony Corporation, Tokyo (JP); Tokyo Metropolitan University, Tokyo (JP)

(72) Inventors: Takahiro Fukuhara, Tokyo (JP); Hitoshi Kiya, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/073,745

(22) Filed: Mar. 18, 2016

(65) Prior Publication Data

US 2016/0205417 A1 Jul. 14, 2016

Related U.S. Application Data

(62) Division of application No. 13/905,929, filed on May 30, 2013, now Pat. No. 9,324,162.

(30) Foreign Application Priority Data

Jun. 8, 2012 (JP) .................................. 2012-130913

(51) Int. Cl.
G06K 9/46 (2006.01)
H04N 19/91 (2014.01)
H04N 19/186 (2014.01)
H04N 19/34 (2014.01)
H04N 19/44 (2014.01)

(52) U.S. Cl.
CPC ............ *H04N 19/91* (2014.11); *H04N 19/186* (2014.11); *H04N 19/34* (2014.11); *H04N 19/44* (2014.11)

(58) Field of Classification Search
None
See application file for complete search history.

(56) References Cited

U.S. PATENT DOCUMENTS

| 8,345,144 B1 | 1/2013 | Georgiev et al. |
| 2003/0099291 A1 | 5/2003 | Kerofsky |
| 2010/0046612 A1 | 2/2010 | Sun et al. |
| 2010/0195908 A1 | 8/2010 | Bechtel et al. |
| 2010/0303349 A1 | 12/2010 | Bechtel et al. |

FOREIGN PATENT DOCUMENTS

| JP | 7-46407 | 2/1995 |
| JP | 2011-150401 | 8/2011 |

(Continued)

OTHER PUBLICATIONS

Masahiro Iwahashi, Two Layered Lossless Coding of High Dynamic Range Images, ITE Technical Report, vol. 36, No. 21, Japan, (General Incorporated Association) The Institute of Image Information and Television Engineers, Jun. 4, 2012, vol. 36/No. 21, 17-20.

(Continued)

*Primary Examiner* — Stephen R Koziol
*Assistant Examiner* — Amandeep Saini
(74) *Attorney, Agent, or Firm* — Frommer Lawrence & Haug LLP; William S. Frommer

(57) ABSTRACT

There is provided an image processing apparatus including a tone mapper that losslessly tone maps image data in a floating-point representation, a base layer generator that generates base layer image data by reducing a bit depth of the image data tone mapped by the tone mapper, and an enhancement layer generator that generates enhancement layer data by using the image data tone mapped by the tone mapper and the base layer image data generated by the base layer generator.

7 Claims, 8 Drawing Sheets

(56) References Cited

FOREIGN PATENT DOCUMENTS

| | | |
|---|---|---|
| JP | 2011-176407 | 9/2011 |
| JP | 2011176407 A * | 9/2011 |

OTHER PUBLICATIONS

Office Action issued in corresponding Japanese Application No. 2012-130913 dated Aug. 23, 2016 and its English Translation.

* cited by examiner

IMAGE PROCESSING APPARATUS, METHOD, AND PROGRAM

This is a division of application Ser. No. 13/905,929, filed May 30, 2013, which is entitled to the priority filing date of Japanese application 2012-130913, filed on Jun. 8, 2012, the entirety of which is incorporated herein by reference.

BACKGROUND

The present technology relates to an image processing apparatus, method, and program, and more particularly, to an image processing apparatus, method, and program enabling further reduction in the size of the data to generate.

The dynamic range of images has been increasing recently due to advances such as image sensors with higher bit depths and displays with high bit support.

Hitherto, many research findings regarding the coded representation of high bit depth images have been reported. For example, there has been proposed a two-stage coding method that creates a low bit depth image by tone mapping, and then encodes the difference between that decoded image and the original image with a separate encoder (for example, see "Bit-depth Scalable Video Coding", Proc. IEEE Intl. Conf. on Image Processing, pp. 1-5 to 1-7, 2007 (W. Winken, D. Marpe, etc.)).

Also proposed is a method that realizes a bit rate reduction during lossy compression by applying Lloyd-Max quantization instead of tone mapping (for example, see "A Study of Coding Method for High Bit Depth Image Using Bit Depth Transform", IEICE General Conference 2009, S-5, 2009 (Ito, Bando, Takamura, Kamikura, Yashima)).

SUMMARY

However, with these techniques the bit depth of the enhancement layer increases, and there is a risk of being unable to sufficiently reduce the data size.

In light of such conditions, it is desirable to further reduce the size of the data to generate.

According to an embodiment of the present disclosure, there is provided an image processing apparatus including a tone mapper that losslessly tone maps image data in a floating-point representation, a base layer generator that generates base layer image data by reducing a bit depth of the image data tone mapped by the tone mapper, and an enhancement layer generator that generates enhancement layer data by using the image data tone mapped by the tone mapper and the base layer image data generated by the base layer generator.

The tone mapper may tone map the image data in a floating-point representation with a lossless logarithmic mapping.

The tone mapper may tone map the image data in a floating-point representation by multiplying a differential value between an exponent of the image data in a floating-point representation and a minimum value of the exponent by 2 to a power of a bit depth of a mantissa of the image data in a floating-point representation, and further adds the mantissa of the image data in a floating-point representation to a result of the multiplication.

The base layer generator may include a first computing unit that subjects the image data tone mapped by the tone mapper to calculation by 2 to a power of a negative of an absolute value of the bit depth of the base layer image data, and a rounding unit that generates the base layer image data by discarding a fractional part of the image data subjected to the power of 2 multiplication by the first computing unit.

The first computing unit may bitshift a pixel value in the image data tone mapped by the tone mapper to a right by an amount equivalent to the bit depth of the base layer image data.

The enhancement layer generator may include a second computing unit that subjects the base layer image data to calculation by 2 to a power of the bit depth of the base layer image data, and a differential data generator that generates differential data between the image data tone mapped by the tone mapper and the base layer image data subjected to the power of 2 calculation by the second computing unit.

The second computing unit may bitshift a pixel value in the base layer image data to a left by an amount equivalent to the bit depth of the base layer image data.

The image processing apparatus may further include a base layer encoder that encodes the base layer image data generated by the base layer generator.

The image processing apparatus may further include an enhancement layer encoder that encodes the enhancement layer data generated by the enhancement layer generator.

According to an embodiment of the present disclosure, there is provided an image processing method for an image processing apparatus, the image processing apparatus losslessly tone mapping image data in a floating-point representation, generating base layer image data by reducing a bit depth of the tone mapped image data, generating enhancement layer data by using the tone mapped image data and the generated base layer image data.

According to an embodiment of the present disclosure, there is provided a program for causing a computer to function as a tone mapper that losslessly tone maps image data in a floating-point representation, a base layer generator that generates base layer image data by reducing a bit depth of the image data tone mapped by the tone mapper, and an enhancement layer generator that generates enhancement layer data by using the image data tone mapped by the tone mapper and the base layer image data generated by the base layer generator.

According to an embodiment of the present disclosure, there is provided an image processing apparatus including an image data generator that generates tone mapped image data by using enhancement layer data and base layer image data, the enhancement layer data having been generated using image data obtained by tone mapping image data in a floating-point representation and the base layer image data having been generated from the tone mapped image data, and an inverse tone mapper that generates image data in a floating-point representation by applying a lossless inverse tone mapping to the tone mapped image data generated by the image data generator.

The inverse tone mapper may generate the image data in a floating-point representation with a lossless inverse logarithmic mapping.

The image data generator may include a computing unit that subjects the base layer image data to calculation by 2 to a power of a bit depth of the base layer image data, and an adder that generates the tone mapped image data by adding the base layer image data subjected to the power of 2 calculation by the computing unit to the enhancement layer data.

The computing unit may bitshift a pixel value in the base layer image data to a left by an amount equivalent to the bit depth of the base layer image data.

The image processing apparatus may further include a base layer decoder that decodes encoded data of the base layer image data. The image data generator may generate the tone mapped image data by using the base layer image data obtained by the base layer decoder.

The image processing apparatus may further include an enhancement layer decoder that decodes encoded data of the enhancement layer data. The image data generator may generate the tone mapped image data by using the enhancement layer data obtained by the enhancement layer decoder.

The image processing apparatus may further include a receiver that receives encoding-related information, a base layer decoder that decodes encoded data of the base layer image data in a format that corresponds to an encoding format specified by the encoding-related information received by the receiver, and an enhancement layer decoder that decodes encoded data of the enhancement layer data in a format that corresponds to an encoding format specified by the encoding-related information received by the receiver.

According to another embodiment of the present disclosure, there is provided an image processing method for an image processing apparatus, the image processing apparatus generating tone mapped image data by using enhancement layer data and base layer image data, the enhancement layer data having been generated using image data obtained by tone mapping image data in a floating-point representation and the base layer image data having been generated from the tone mapped image data, generating image data in a floating-point representation by applying a lossless inverse tone mapping to the generated tone mapped image data.

According to another embodiment of the present disclosure, there is provided a program for causing a computer to function as an image data generator that generates tone mapped image data by using enhancement layer data and base layer image data, the enhancement layer data having been generated using image data obtained by tone mapping image data in a floating-point representation and the base layer image data having been generated from the tone mapped image data, and an inverse tone mapper that generates image data in a floating-point representation by applying a lossless inverse tone mapping to the tone mapped image data generated by the image data generator.

According to an embodiment of the present technology, image data in a floating-point representation is losslessly tone mapped, the bit depth of the tone mapped image data is reduced to generate base layer image data, and enhancement layer data is generated using the tone mapped image data and the generated base layer image data.

According to another embodiment of the present technology, tone mapped image data is generated using enhancement layer data and base layer image data, the enhancement layer data having been generated using the base layer image data and tone mapped image data obtained by tone mapping image data in a floating-point representation, and the base layer image data having been generated from the tone mapped image data, and the tone mapped image data thus generated is losslessly inverse tone mapped to generate image data in a floating-point representation.

According to the embodiments of the present technology, it is possible to process an image. Particularly, it is possible to further reduce data size.

DETAILED DESCRIPTION OF THE EMBODIMENT(S)

Figure 1:
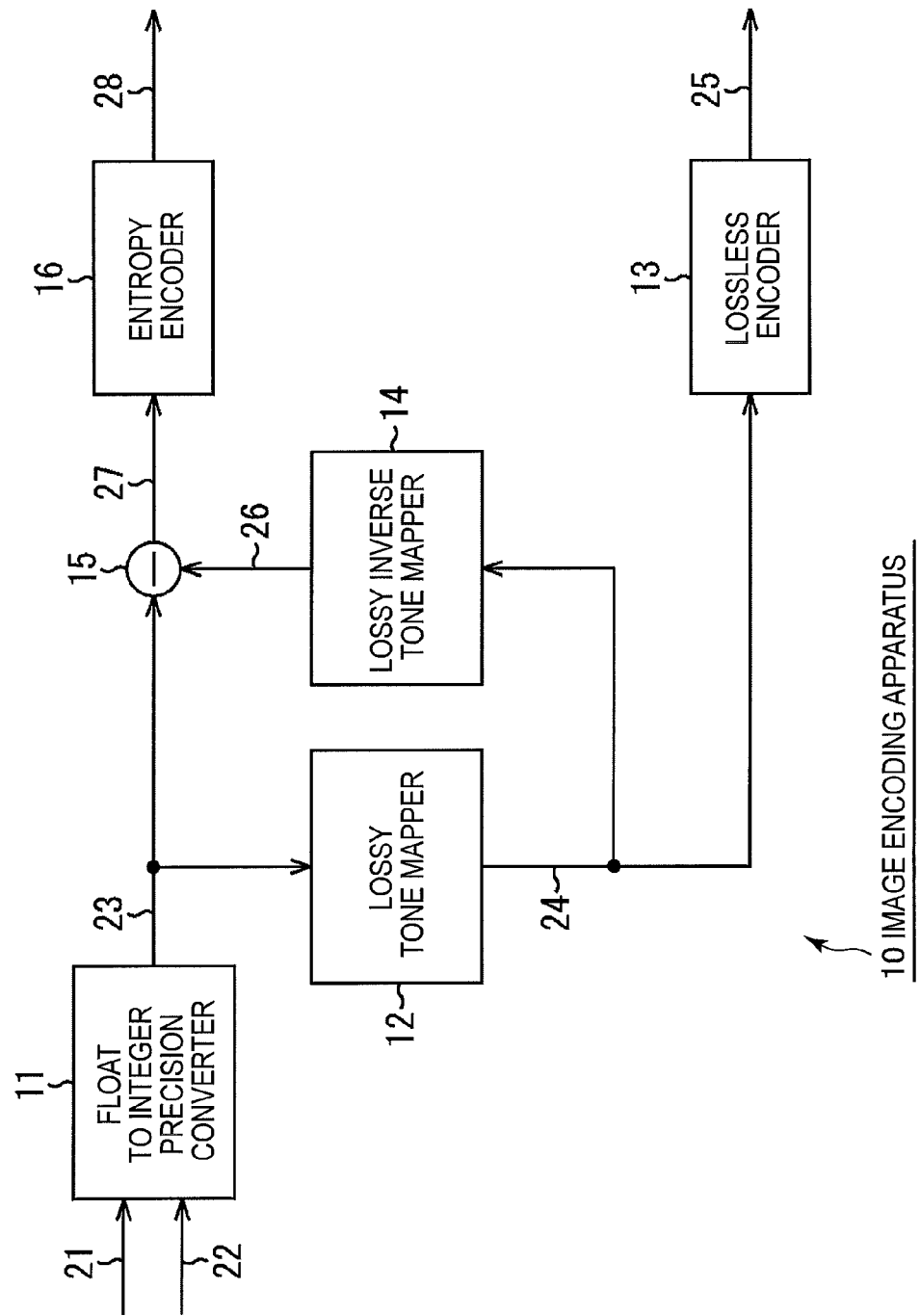
FIG. 1 is a block diagram illustrating an exemplary primary configuration of an image encoding apparatus.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, embodiments for carrying out the present disclosure (hereinafter designated embodiments) will be described. The description will proceed in the following order.

1. First Embodiment (image encoding apparatus, image decoding apparatus)
2. Second Embodiment (computer)

1. First Embodiment 1-1. Image Encoding Apparatus

First, typical high dynamic range image coding will be described.

In the digital data compression of images or video, coding schemes in which the compression results are separated into multiple layers are called scalability functions, and many research findings on such functions have been reported hitherto. Currently, bit depth scalability is being researched in earnest.

Bit depth means the number of tones that a pixel value represents. A general-purpose device with a bit depth of 8 bits is able to represent $2^8=256$ tones. Recently, by using floating-point formats in addition to fixed decimal formats, it is becoming possible to represent a wider numerical range (high dynamic range).

There exists a method of encoding such a high dynamic range represented in a floating-point format by separating the image into a base layer and an enhancement layer. With encoded data separated into two layers in this way, a low dynamic range image at the standard bit depth can be decoded from the base layer, and by combining the base layer with the enhancement layer, the original high dynamic range image can be decoded.

There have been many research reports on such bit depth scalability. For example, a low dynamic range image may be created from a high dynamic range image by tone mapping, and then compressed in the Joint Photographic Experts Group (JPEG) format to create the base layer. In addition, the low dynamic range is reverse tone mapped, and the difference from the high dynamic range image is taken as the enhancement layer. However, with this method, pixel correlation is small because the enhancement layer is residual data, and thus suffers from diminished expectations for a high compression rate.

FIG. 1 is a block diagram illustrating an exemplary primary configuration of an image encoding apparatus that encodes an image with such floating-point precision separately into a base layer and an enhancement layer. As illustrated in FIG. 1, the image encoding apparatus 10 includes a float to integer precision converter 11, a lossy tone mapper 12, a lossless encoder 13, a lossy inverse tone mapper 14, a differential data generator 15, and an entropy encoder 16.

Floating-point precision data is typically made up of a sign $b_s$, a mantissa $b_M$, and an exponent $b_E$. Each value is expressed as in the following Eq. 1.

$$b_s \in [0, 2^{D_s}], b_M \in [0, 2^{D_M}], b_E \in [0, 2^{D_E}] \quad (1)$$

Assume also that the individual bit depths are $D_s$, $D_M$, and $D_E$ (bits).

For example, in the OpenEXR format which is prevalent as a floating-point precision image format, each color R, G, and B has a bit depth of $[D_s, D_M, D_E] = [1, 10, 5]$, yielding 48 bpp overall.

Meanwhile, in the RGBE format, there is no sign, and although the mantissa is $D_M = 8$ for each of R, G and B, the exponent is $D_E = 8$ and shared among R, G, and B, yielding 32 bpp overall.

For example, in the case of OpenEXR, pixel values are defined as in the following Eq. 2 for $0 < b_E < 31$. Note that the mantissa $X_M$ and the exponent $X_E$ are real numbers expressed as in the following Eqs. 3 and 4, respectively.

$$X = X_M 2^{X_E} \quad (2)$$

$$X_M = (-1)^{bs} \cdot (1 + bM \cdot 2^{(-D_M)}) \quad (3)$$

$$X_E = b_E - 15 \quad (4)$$

For the sake of convenience, assume $b_s = 0$ (in other words, a positive number). In FIG. 1, the mantissa $b_M$ (arrow 21) and the exponent $b_E$ (arrow 22) in floating-point representation are input into the image encoding apparatus 10. The float to integer precision converter 11 applies a 1-to-1 mapping on the image data from floating-point precision to integer precision. In other words, the mantissa $b_M$ (arrow 21) and the exponent $b_E$ (arrow 22) are converted into integer-precision image data $X_I$ (arrow 23), as in Eq. 5 below.

$$X_I = (2^{D_M} + b_M) \cdot 2^{(b_E - \text{Min}(b_E))} \quad (5)$$

The above conversion is introduced in G. Ward and M. Simmons, "JPEG-HDR: A Backwards Compatible High Dynamic Range Extension to JPEG", Proc. 13th Color Imaging Conference, November 2005.

The lossy tone mapper 12 tone maps the image data $X_I$ into image data V according to Eqs. 6 and 7 below. As a result, the bit depth is reduced to $D_V$.

$$V^* = \log_e(X_I) \quad (6)$$

$$V = \lfloor (2^{D_V} - 1) \cdot (V^* - \text{Min}(V^*)) / (\text{Max}(V^*) - \text{Min}(V^*)) \rfloor \quad (7)$$

This tone mapping rule is introduced in R. Xu, S. N. Pattanaik and C. E. Hughes, "High Dynamic-Range Still-Image Encoding in JPEG2000", IEEE Computer Graphics and Applications, vol. 25, no. 6, pp. 57-64, 2005.

Whereas the original image was a high dynamic range image, the image data V that has been tone mapped by the above Eqs. 6 and 7 (arrow 24) may be referred to as a low dynamic range image, since the bit depth has been reduced compared to the original image. In other words, the image data V is equivalent to the base layer image.

The lossless encoder 13 losslessly encodes the base layer image data V (arrow 24) according to a given method, and generates a base layer encoded codestream (arrow 25).

The lossy inverse tone mapper 14 applies the inverse of the tone mapping applied by the lossy tone mapper 12 to the base layer image data V (arrow 24), thus increasing the bit depth and generating high dynamic range image data (arrow 26).

The differential data generator 15 subtracts the high dynamic range image data generated by the lossy inverse tone mapper 14 (arrow 26) from the high dynamic range image data XI generated by the float to integer precision converter 11 (arrow 23), thereby generating the differential data therebetween (arrow 27). This differential data is equivalent to the enhancement layer.

The entropy encoder 16 applies entropy encoding to the differential data (arrow 27) according to a given method, and generates an enhancement layer encoded codestream (arrow 28).

The image encoding apparatus 10 outputs the base layer encoded codestream (arrow 25) and the enhancement layer encoded codestream (arrow 28).

1-2. Image Decoding Apparatus

Figure 2:
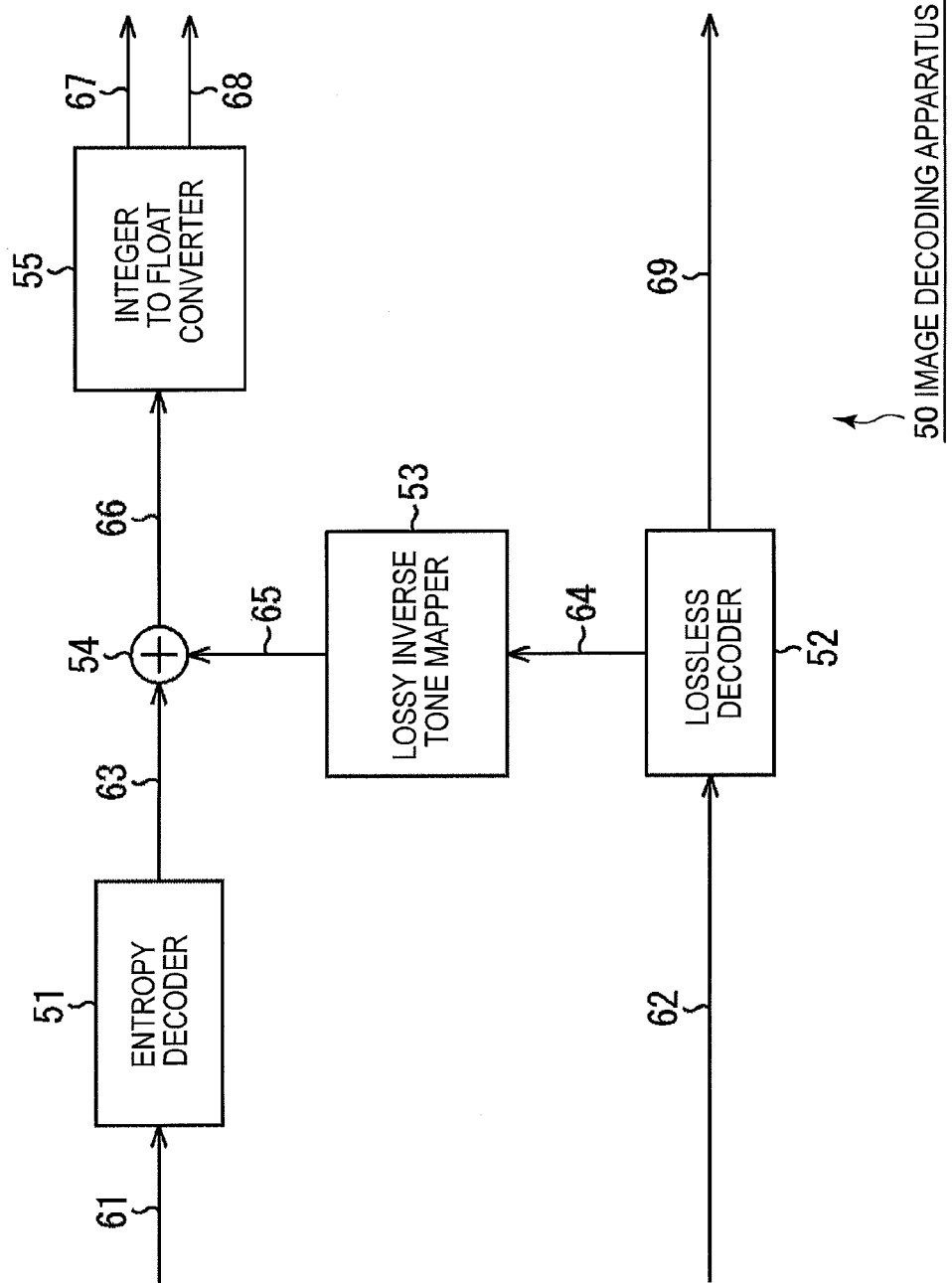
FIG. 2 is a block diagram illustrating an exemplary primary configuration of an image decoding apparatus.

FIG. 2 is a block diagram illustrating an exemplary primary configuration of an image decoding apparatus corresponding to the image encoding apparatus 10 in FIG. 1.

The image decoding apparatus 50 illustrated in FIG. 2 receives and decodes the base layer encoded codestream (arrow 62) and the enhancement layer encoded codestream (arrow 61) generated at the image encoding apparatus 10, thus generating low dynamic range image data (arrow 69) and high dynamic range image data in a floating-point representation (arrow 67 and arrow 68).

As illustrated in FIG. 2, the image decoding apparatus 50 includes an entropy decoder 51, a lossless decoder 52, a lossy inverse tone mapper 53, an adder 54, and an integer to float converter 55.

The entropy decoder 51 applies entropy decoding to the supplied enhancement layer encoded codestream (arrow 61) according to a method that corresponds to the entropy encoder 16 in FIG. 1, and generates enhancement layer differential data (arrow 63).

The lossless decoder 52 losslessly decodes the supplied base layer encoded codestream (arrow 62) according to a method that corresponds to the lossless encoder 13 in FIG. 1, and generates base layer image data (arrow 64 and arrow 69).

The lossy inverse tone mapper 53 applies inverse tone mapping to the base layer image data (arrow 64) according to a method similar to that of the lossy inverse tone mapper 14 in FIG. 1, thus increasing the bit depth and generating high dynamic range image data (arrow 65).

The adder 54 adds together the enhancement layer differential data generated by the entropy decoder 51 (arrow 63) and the high dynamic range image data generated by the lossy inverse tone mapper 53 (arrow 65), and generates high dynamic range image data combining the base layer and the enhancement layer (arrow 66).

The integer to float converter 55 applies the inverse of the mapping applied by the float to integer precision converter 11 in FIG. 1 to the integer-precision high dynamic range image data (arrow 66), or in other words, applies a 1-to-1 mapping from integer precision to floating-point precision.

In other words, the integer-precision image data (arrow 66) is converted into a mantissa $b_M$ (arrow 67) and an exponent $b_E$ (arrow 68) as in the earlier Eq. 5.

1-3. Compression Rate

With a method like the above, the compression rate of the enhancement layer becomes extremely low. In the image encoding apparatus 10 in FIG. 1, the bit depth of $X_I$ is as in Eq. 8 below.

$$D_I = D_M + 2^{\hat{}} D_E \qquad (8)$$

Consequently, the bit depth is large, and there is a risk of the image data size becoming equivalently large. In addition, since the bit depth of the differential data is also large as a result, realizing lossless image encoding and encoding has been difficult. Moreover, the bit length of the difference between the decoded image and the original image becomes lengthy, and there is a risk of being unable to losslessly represent the unprocessed, original image.

Also, although entropy encoding is applied to the differential data in the image encoding apparatus 10, the differential data basically exhibits no correlation between neighboring pixels, and thus suffers from diminished expectations for effective compression with transforms such as the discrete cosine transform (DCT) or the discrete wavelet transform (DWT).

1-4. Image Encoding Apparatus

Figure 3:
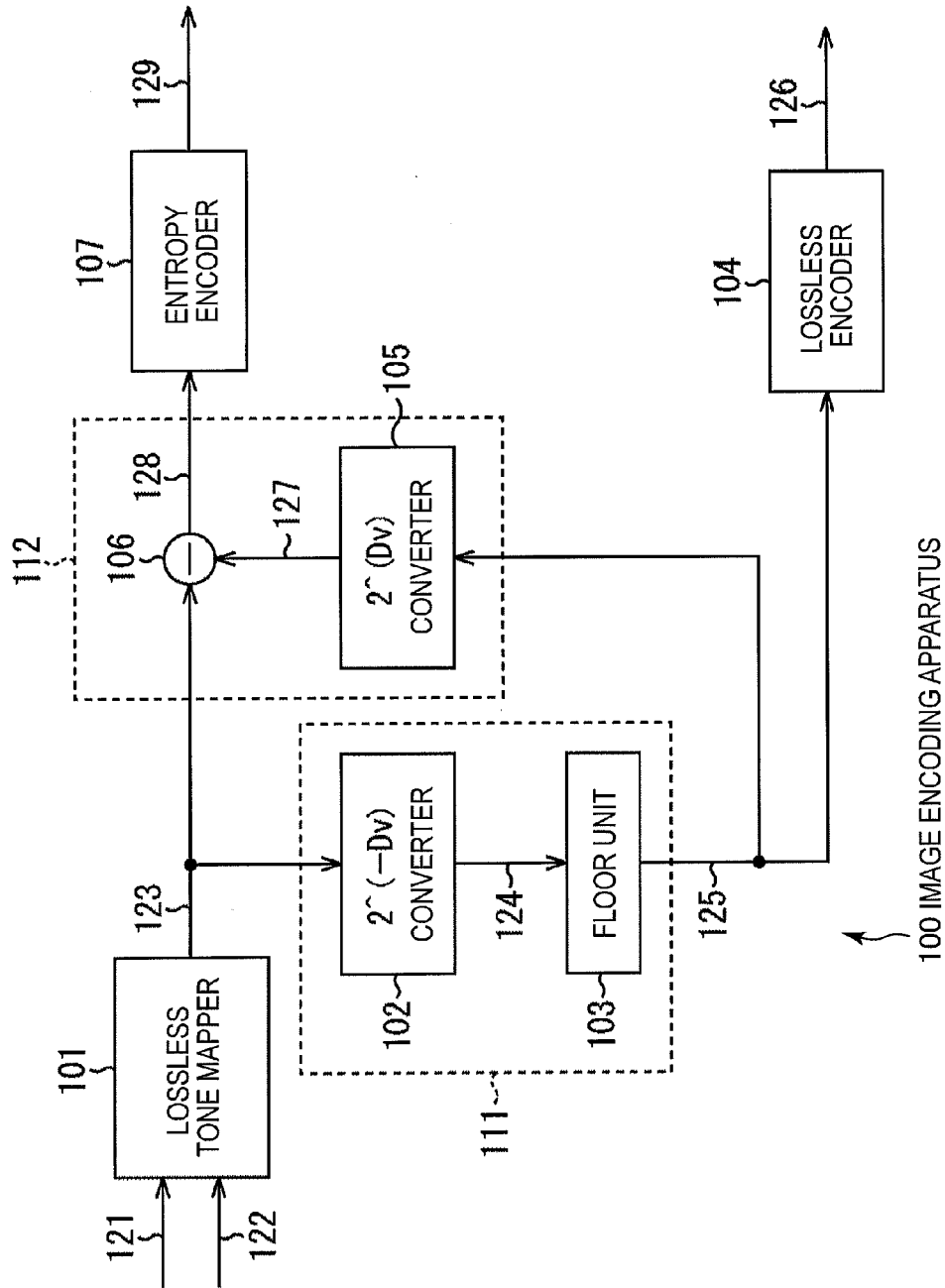
FIG. 3 is a block diagram illustrating an exemplary primary configuration of an image encoding apparatus.

Thus, lossless tone mapping is conducted to further reduce the bit depth. FIG. 3 is a block diagram illustrating an exemplary primary configuration of an image encoding apparatus for this case. The image encoding apparatus 100 illustrated in FIG. 3 is one mode of an image processing apparatus that processes image data, and generates enhancement layer data and base layer low dynamic range image data from high dynamic range image data in a floating-point representation given as input.

Figure 4:
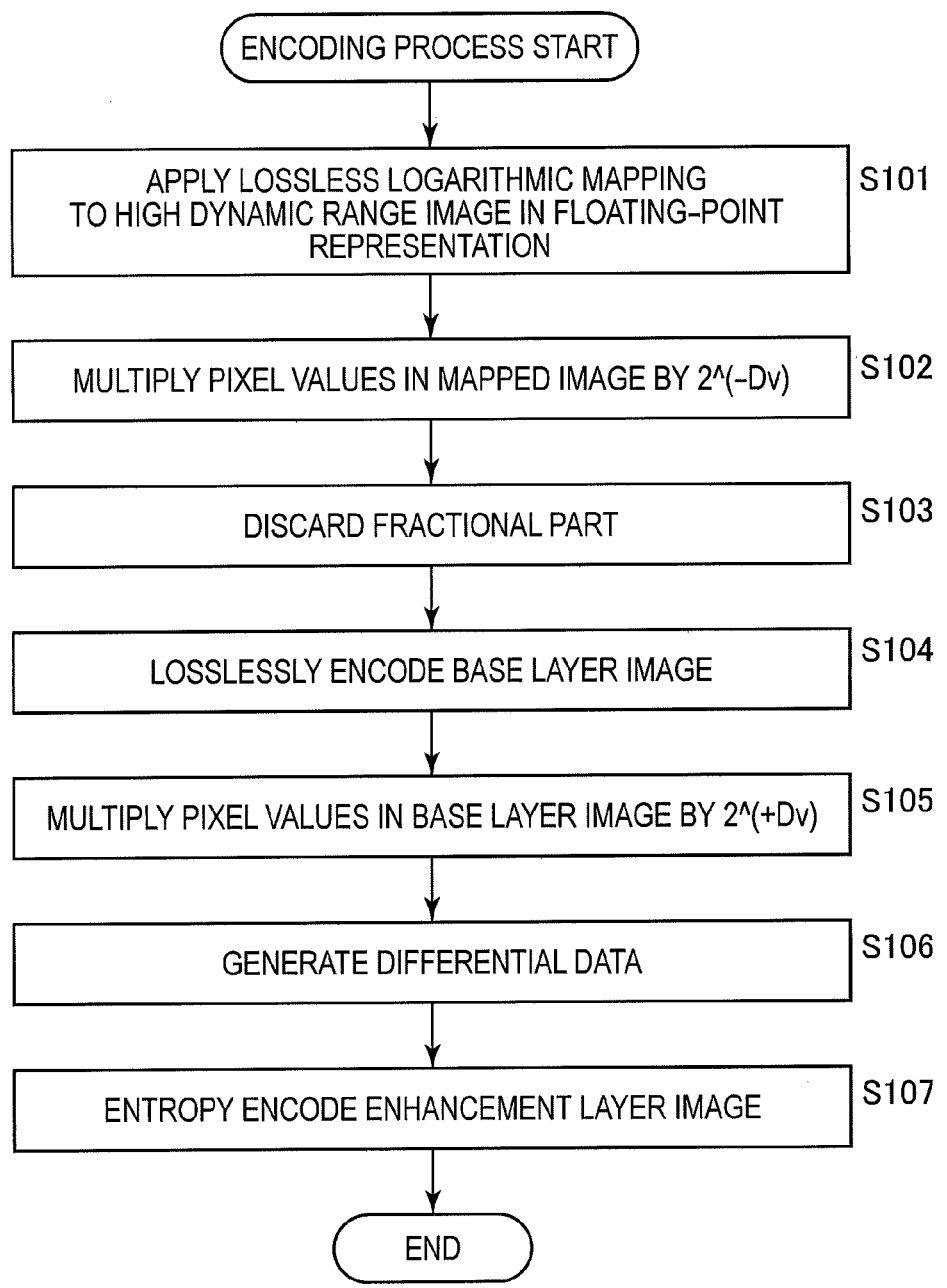
FIG. 4 is a flowchart illustrating an exemplary flow of an encoding process.

As illustrated in FIG. 4, the image encoding apparatus 100 includes a lossless tone mapper 101, a base layer generator 111, an enhancement layer generator 112, a lossless encoder 104, and an entropy encoder 107.

For the sake of convenience, assume $b_s=0$ (in other words, a positive number). In FIG. 3, the mantissa $b_M$ (arrow 121) and the exponent $b_E$ (arrow 122) of high dynamic range image data in a floating-point representation are input into the image encoding apparatus 100. The lossless tone mapper 101 applies a lossless tone mapping as indicated in Eq. 9 below to the high dynamic range image data, and generates tone mapped image data $X_L$ (arrow 123).

$$X_L = (b_E - \mathrm{Min}(b_E)) \cdot 2^{\hat{}} D_M + b_M \qquad (9)$$

The base layer generator 111 reduces the bit depth of the image data $X_L$ tone mapped by the lossless tone mapper 101 (arrow 123), and generates base layer image data. The base layer generator 111 includes a $2^{\hat{}}(-D_V)$ converter 102 and a floor unit 103.

The $2^{\hat{}}(-D_V)$ converter 102 subjects pixel values in the mapped image data $X_L$ (arrow 123) to calculation by the $(-D_V)$th power of 2, provided that $D_V$ is the base layer bit depth, and generates image data with reduced bit depth (arrow 124).

The floor unit 103 converts pixel values in the image data with reduced bit depth (arrow 124) to integers by discarding the fractional part of the pixel values, and generates base layer image data (arrow 125). This image data (arrow 125) is low dynamic range image data with reduced bit depth compared to the high dynamic range image data (arrow 121 and arrow 122).

The lossless encoder 104 losslessly encodes the base layer image data (arrow 125) according to a given method, and generates a base layer encoded codestream (arrow 126). The encoding method is an arbitrary lossless method.

The enhancement layer generator 112 generates enhancement layer data using the image data $X_L$ tone mapped by the lossless tone mapper 101 (arrow 123) and the base layer image data generated by the base layer generator 111 (arrow 125). The enhancement layer generator 112 includes a $2^{\hat{}}(D_V)$ converter 105 and a differential data generator 106.

The $2^{\hat{}}(D_V)$ converter 105 subjects pixel values in the base layer image data generated by the floor unit 103 (arrow 125) to calculation by the $(D_V)$th power of 2, and generates image data with increased bit depth (arrow 127). In other words, the $2^{\hat{}}(D_V)$ converter 105 reverts the bit depth of the reduced image data to the original bit depth.

The differential data generator 106 subtracts the image data generated by the $2^{\hat{}}(D_V)$ converter 105 (arrow 127) from the image data $X_L$ tone mapped by the lossless tone mapper 101 (arrow 123), thereby generating the differential data therebetween (arrow 128). This differential data is equivalent to the enhancement layer.

The entropy encoder 107 applies entropy encoding to the differential data (arrow 128) according to a given method, and generates an enhancement layer encoded codestream (arrow 129). The encoding method is an arbitrary lossless method. An encoding method other than entropy encoding is also acceptable.

The image encoding apparatus 100 outputs the base layer encoded codestream (arrow 126) and the enhancement layer encoded codestream (arrow 129). At this point, the image encoding apparatus 100 may also supply the decoding side with information related to the encoding methods, included in the respective encoded codestreams. The image encoding apparatus 100 may also supply the decoding side with information related to the encoding methods as separate data from the respective encoded codestreams. Note that the image encoding apparatus 100 may also output the unencoded enhancement layer data (arrow 128) and base layer image data (arrow 125).

With the above encoding, the bit depth $D_L$ of the tone mapped image data $X_L$ generated by the lossless tone mapper 101 becomes $2^{\hat{}} D_M \times 2^{\hat{}} D_E = 2^{\hat{}}(D_M + D_E)$, and is thus expressed as in Eq. 10 below in a power of 2 representation.

$$D_L = D_M + D_E \qquad (10)$$

Consequently, the bit depth of the mapped image data is greatly reduced compared to the case of the image encoding apparatus 10 in FIG. 1 (Eq. 8). In other words, the image encoding apparatus 100 is able to further reduce the data size of the enhancement layer data (arrow 128). That is, the image encoding apparatus 100 is able to reduce the bit rate (improve the encoding efficiency) of the enhancement layer encoded codestream (arrow 129) and the base layer encoded codestream (arrow 126). Lossless conversion is also possible since the bit depth is low. Consequently, the decoded image quality can be improved.

Also, in this case, the image data (arrow 127) is simply bitshifted, the fractional part of the pixel values are discarded, and the result is reverse bitshifted. Consequently, there is extremely high correlation between the pixel values in the image data (arrow 123) and the pixel values in the image data (arrow 127). In other words, the differential data generated by the differential data generator 106 (arrow 128)

is able to maintain the correlation between pixels included in the image data (arrow 123). Consequently, the entropy encoder 107 is able to utilize the pixel correlations for more efficient encoding. In other words, the image encoding apparatus 100 is able to improve the encoding efficiency of the enhancement layer encoded codestream (arrow 129).

Furthermore, the $2^{\wedge}(-D_V)$ converter 102 is able to realize bit depth conversion computations by computing a right bitshift by $(D_V)$. Consequently, the $2^{\wedge}(-D_V)$ converter 102 is able to convert the bit depth of image data (reduce the bit depth of image data) with an extremely light processing load. In other words, the image encoding apparatus 100 is able to more easily generate base layer image data (arrow 125) (and thus the base layer encoded codestream (arrow 126)).

Obviously, the $2^{\wedge}(D_V)$ converter 105 is likewise able to realize bit depth conversion computations by computing a left bitshift by $(D_V)$. Consequently, the $2^{\wedge}(D_V)$ converter 105 is able to convert the bit depth of image data (increase the bit depth of image data) with an extremely light processing load. In other words, the image encoding apparatus 100 is able to more easily generate enhancement layer data (arrow 128) (and thus the enhancement layer encoded codestream (arrow 129)).

Note that the bit depth $D_V$ of the base layer image may be arbitrarily set. Thus, it is possible to set the bit depth $D_V$ according to the tone reproduction capabilities of the device or display that will output (display) the base layer image data. In other words, since image data can be generated according to the application, the image encoding apparatus 100 can be applied to a wider variety of systems.

In addition, the bit depth conversion process can be realized by bitshifting, irrespective of the magnitude of the bit depth $D_V$. Consequently, the image encoding apparatus 100 is able to easily generate base layer image data at an arbitrary bit depth, and in addition, generate enhancement layer data accordingly.

1-5. Process Flow

An exemplary flow of an encoding process executed by the image encoding apparatus 100 will now be described with reference to the flowchart in FIG. 4.

When the encoding process starts, in step S101 the lossless tone mapper 101 acquires high dynamic range image data in a floating-point representation, and applies a lossless logarithmic mapping thereto.

In step S102, the $2^{\wedge}(-D_V)$ converter 102 multiplies pixel values in the mapped image data obtained by the processing in step S101 by $2^{\wedge}(-D_V)$.

In step S103, the floor unit 103 discards the fractional part of the pixel values in the image data obtained by the processing in step S102, and generates base layer image data.

In step S104, the lossless encoder 104 losslessly encodes the base layer image data obtained by the processing in step S103, and outputs the result as a base layer encoded codestream.

In step S105, the $2^{\wedge}(D_V)$ converter 105 multiplies pixel values in the base layer image data obtained by the processing in step S103 by $2^{\wedge}(D_V)$.

In step S106, the differential data generator 106 generates enhancement layer differential data by subtracting the image data obtained by the processing in step S105 from the mapped image data obtained by the processing in step S101.

In step S107, the entropy encoder 107 applies entropy encoding to the enhancement layer differential data obtained by the processing in step S106, and outputs the result as an enhancement layer encoded codestream.

By conducting an encoding process as above, the image encoding apparatus 100 is able to further reduce the data size. Note that the processing in step S104 may be omitted. In this case, the image encoding apparatus 100 outputs the base layer image data without encoding that data. The processing in step S107 may also be omitted. In this case, the image encoding apparatus 100 outputs the enhancement layer data without encoding that data.

1-6. Image Decoding Apparatus

Figure 5:
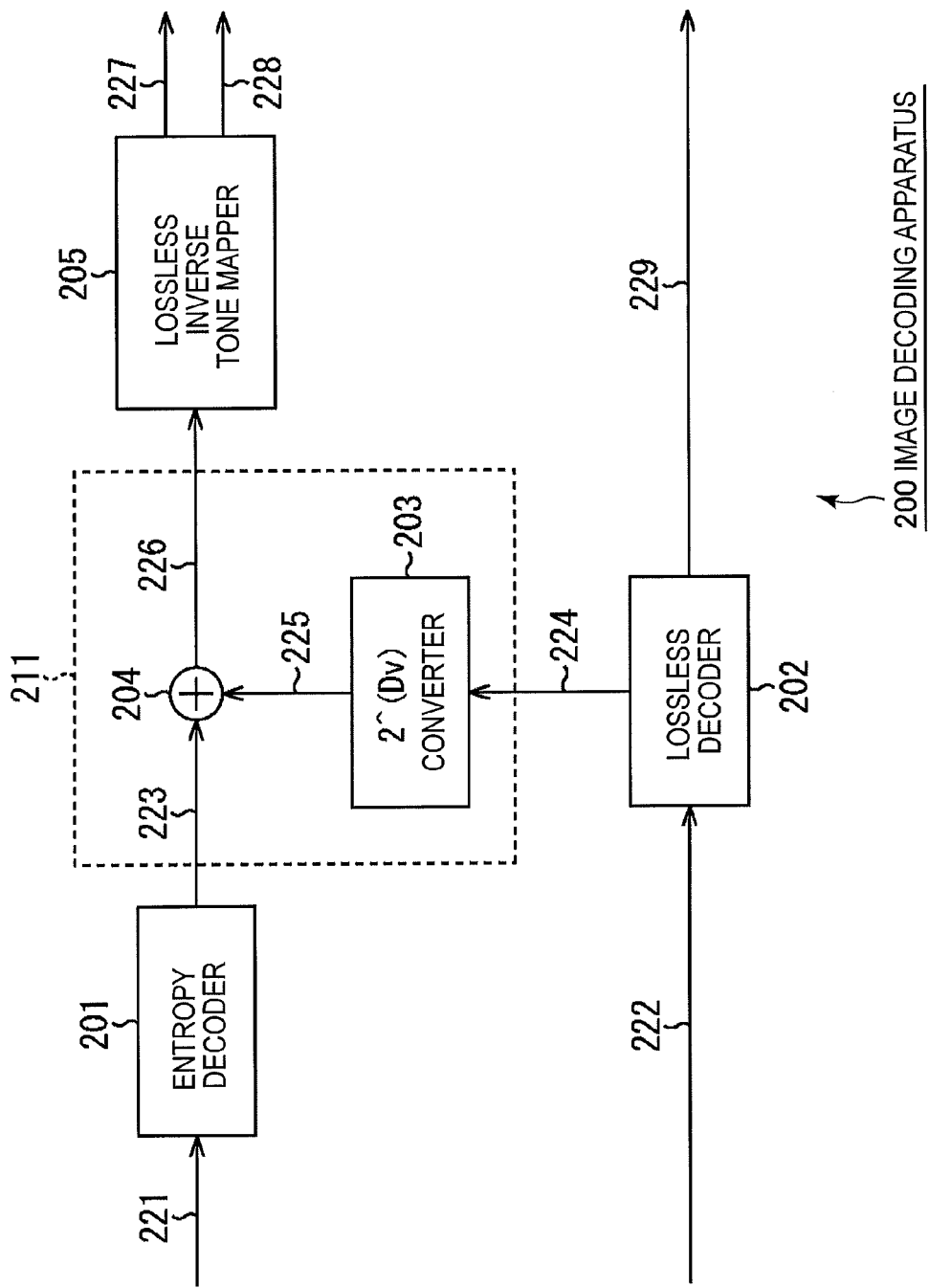
FIG. 5 is a block diagram illustrating an exemplary primary configuration of an image decoding apparatus.

FIG. 5 is a block diagram illustrating an exemplary primary configuration of an image decoding apparatus corresponding to the image encoding apparatus 100 in FIG. 3. The image decoding apparatus is one mode of an image processing apparatus.

The image decoding apparatus 200 illustrated in FIG. 5 receives and decodes the base layer encoded codestream (arrow 222) and the enhancement layer encoded codestream (arrow 221) generated at the image encoding apparatus 100, thus generating low dynamic range image data (arrow 229) and high dynamic range image data in a floating-point representation (arrow 227 and arrow 228). Note that in the case where the image encoding apparatus 100 outputs unencoded base layer image data and enhancement layer data, the image decoding apparatus 200 acquires that data.

As illustrated in FIG. 5, the image decoding apparatus 200 includes an entropy decoder 201, a lossless decoder 202, an image data generator 211, and a lossless inverse tone mapper 205.

The entropy decoder 201 applies entropy decoding to the supplied enhancement layer encoded codestream (arrow 221) according to a method that corresponds to the entropy encoder 107 in FIG. 3, and generates enhancement layer differential data (arrow 223). The decoding method may be predetermined, but may also be determined on the basis of information related to an encoding method which is supplied by being included in the enhancement layer encoded codestream from the image encoding apparatus 100, or supplied as separate data from the enhancement layer encoded codestream, for example. Note that the entropy decoder 201 may be omitted in the case where the image encoding apparatus 100 outputs unencoded enhancement layer data.

The lossless decoder 202 losslessly decodes the supplied base layer encoded codestream (arrow 222) according to a method that corresponds to the lossless encoder 104 in FIG. 3, and generates base layer low dynamic range image data (arrow 224 and arrow 229). The decoding method may be predetermined, but may also be determined on the basis of information related to an encoding method which is supplied by being included in the base layer encoded codestream from the image encoding apparatus 100, or supplied as separate data from the base layer encoded codestream, for example. Note that the lossless decoder 202 may be omitted in the case where the image encoding apparatus 100 outputs unencoded base layer low dynamic range image data.

The image data generator 211 generates high dynamic range image data (arrow 226) by using the enhancement layer differential data generated by the entropy decoder 201 (arrow 223) (or enhancement layer differential data supplied from the image encoding apparatus 100), and base layer low dynamic range image data generated by the lossless decoder 202 (arrow 224) (or base layer image data supplied from the image encoding apparatus 100). This high dynamic range image data corresponds to the tone mapped image data $X_L$ (arrow 123) in the image encoding apparatus 100.

As illustrated in FIG. 5, the image data generator 211 includes a $2^{\wedge}(D_V)$ converter 203 and an adder 204.

The $2^{\wedge}(D_V)$ converter 203 is a processing unit similar to the $2^{\wedge}(D_V)$ converter 105 in the image encoding apparatus 100. In other words, the $2^{\wedge}(D_V)$ converter 203 subjects pixel values in the base layer image data generated by the lossless decoder 202 (arrow 224) to calculation by the $(D_V)$th power of 2, and generates image data with increased bit depth (arrow 225). In other words, the $2^{\wedge}(D_V)$ converter 203 reverts the bit depth of the image data whose bit depth was reduced by the $2^{\wedge}(-D_V)$ converter 102 in the image encoding apparatus 100, for example.

The adder 204 adds together the enhancement layer differential data generated by the entropy decoder 201 (arrow 223) (or enhancement layer differential data supplied from the image encoding apparatus 100) and the image data generated by the $2^{\wedge}(D_V)$ converter 203 (arrow 225), and generates high dynamic range image data (arrow 226).

The lossless inverse tone mapper 205 applies the inverse of the lossless logarithmic mapping by the lossless tone mapper 101 in FIG. 3 to the high dynamic range image data (arrow 226). In other words, the lossless inverse tone mapper 205 uses the earlier Eq. 9 to convert the high dynamic range image data (arrow 226) into a mantissa $b_M$ (arrow 227) and an exponent $b_E$ (arrow 228).

The image decoding apparatus 200 outputs the base layer low dynamic range image data (arrow 229), as well as the mantissa $b_M$ (arrow 227) and the exponent $b_E$ (arrow 228) of the high dynamic range image data in a floating-point representation, in which the enhancement layer and the base layer are combined.

Consequently, the image decoding apparatus 200 is able to decode data generated by the image encoding apparatus 100, and generate low dynamic range image data and high dynamic range image data. In other words, the image decoding apparatus 200 is able to realize a reduction in the data size of the enhancement layer data (arrow 128). That is, the image decoding apparatus 200 is able to realize a reduction in the bit rate (an improvement in the encoding efficiency) of the enhancement layer encoded codestream and the base layer encoded codestream (arrow 126). Lossless conversion is also possible since the bit depth is low. Consequently, improved image quality in the decoded image can be realized.

In addition, the $2^{\wedge}(D_V)$ converter 203 is able to realize bit depth conversion computations by computing a left bitshift by $(D_V)$. Consequently, the $2^{\wedge}(D_V)$ converter 203 is able to convert the bit depth of image data (increase the bit depth of image data) with an extremely light processing load. In other words, the image decoding apparatus 200 is able to more easily generate enhancement layer data (arrow 226) (and thus the enhancement layer encoded codestream (arrow 227 and arrow 228)).

Note that the bit depth $D_V$ of the base layer image is arbitrary. In other words, the image decoding apparatus 200 can be applied to a wider variety of systems.

1-7. Process Flow

Figure 6:
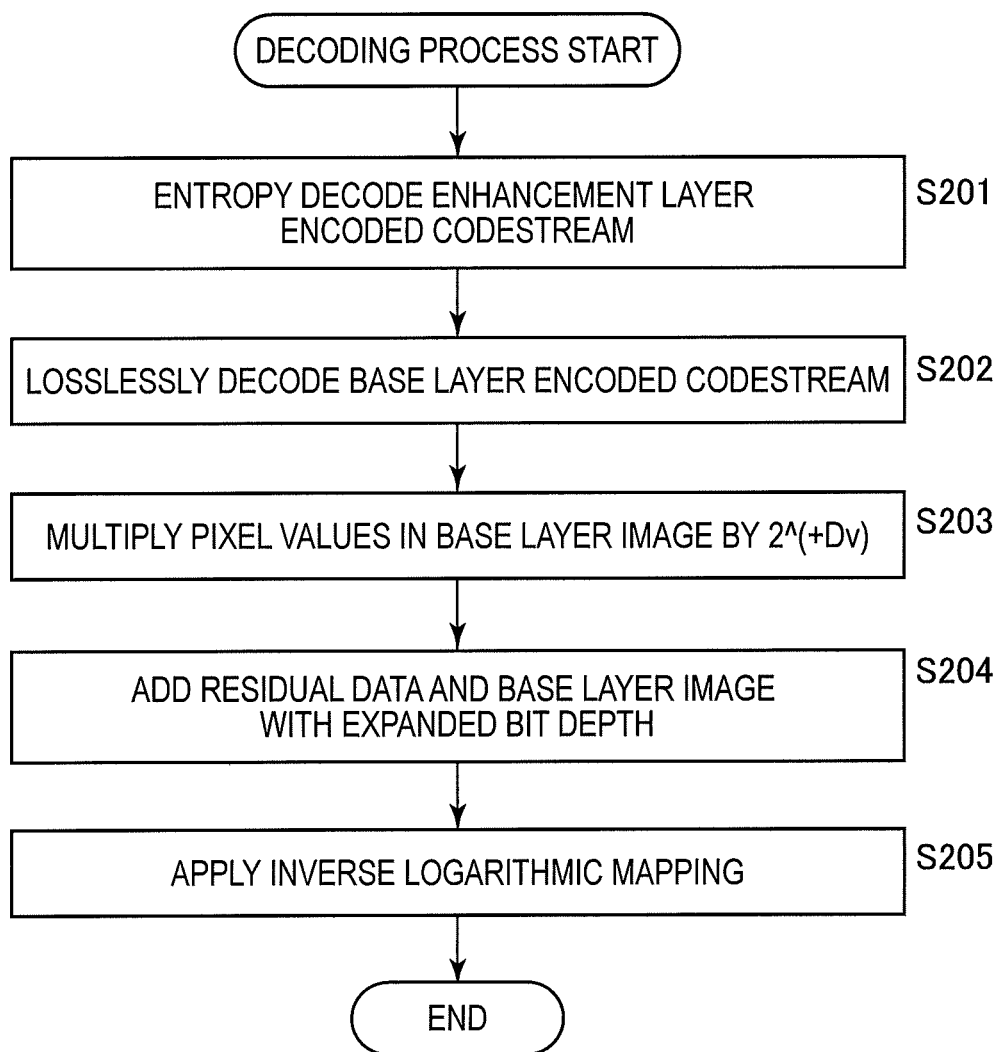
FIG. 6 is a flowchart illustrating an exemplary flow of a decoding process.

An exemplary flow of a decoding process executed by the image decoding apparatus 200 will now be described with reference to the flowchart in FIG. 6.

When the decoding process starts, in step S201 the entropy decoder 201 acquires an enhancement layer encoded codestream, applies entropy decoding thereto according to a decoding method that corresponds to the encoding method applied by the processing in step S107 of FIG. 4, and generates enhancement layer data.

In step S202, the lossless decoder 202 acquires and losslessly decodes a base layer encoded codestream according to a decoding method that corresponds to the encoding method applied by the processing in step S104 of FIG. 4, and thus generates and outputs base layer image data.

In step S203, the $2^{\wedge}(D_V)$ converter 203 multiplies pixel values in the base layer image data obtained by the processing in step S202 by $2^{\wedge}(D_V)$.

In step S204, the adder 204 adds together the enhancement layer data obtained by the processing in step S201 and the base layer image data obtained by the processing in step S203.

In step S205, the lossless inverse tone mapper 205 applies an inverse logarithmic mapping to the high dynamic range image data obtained by the processing in step S204, and thus generates and outputs high dynamic range image data in a floating-point representation.

By conducting a decoding process as above, the image decoding apparatus 200 is able to realize a reduction in the data size. Note that the processing in step S201 and step S202 may be omitted.

1-8. Bit Depth

Figure 7:
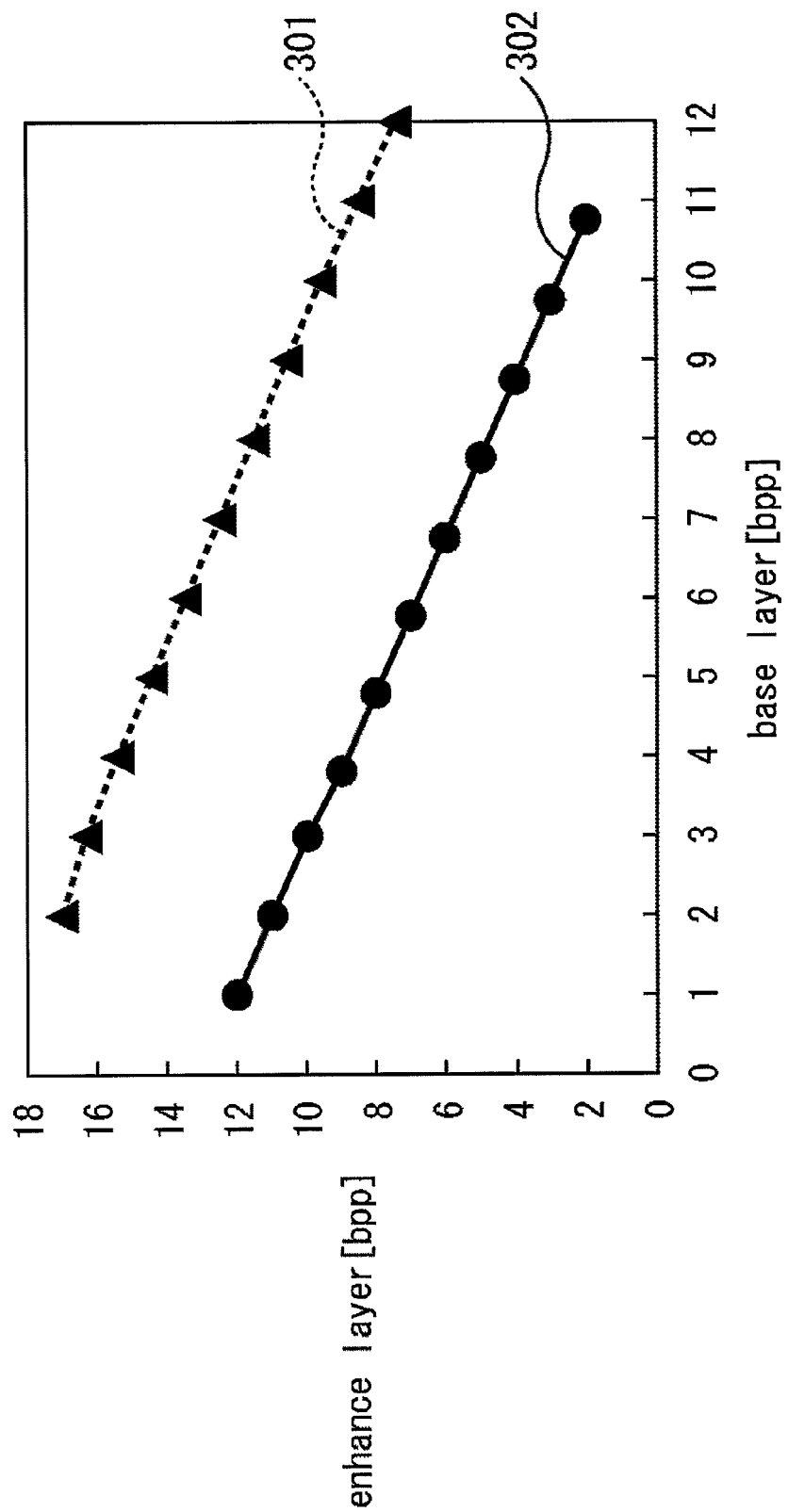
FIG. 7 is a diagram illustrating an exemplary bit depth comparison.

FIG. 7 is a diagram illustrating a comparison of bit depth in the base layer and the enhancement layer.

In the graph illustrated in FIG. 7, the dotted line 301 joins exemplary plots of the bit depth of base layer image data and the bit depth of enhancement layer data generated by the image encoding apparatus 10 (FIG. 1). Meanwhile, the solid line 302 joins exemplary plots of the bit depth of base layer image data and the bit depth of enhancement layer data generated by the image encoding apparatus 100 (FIG. 3).

As illustrated in FIG. 7, the image encoding apparatus 100 (FIG. 3) is able to generate enhancement layer data at lower bit depths than the image encoding apparatus 10 (FIG. 1), irrespective of the magnitude of the base layer bit depth.

In other words, the image encoding apparatus 100 (FIG. 3) is able to further reduce the size of the data to generate compared to the image encoding apparatus 10 (FIG. 1).

Note that the present technology is applicable to technology such as equipment and devices that use images captured from an image sensor (such as a complementary metal-oxide-semiconductor (CMOS) image sensor or charge-coupled device (CCD) image sensor, for example), compression circuits that write sensor images to memory, digital still cameras, video camcorders, medical imaging cameras, medical endoscopes, surveillance cameras, digital cinema cameras, binocular cameras, stereo and multicameras, reduced-memory circuits in an integrated circuit such as a microcontroller chip or system on a chip (SoC), and authoring tools and related software modules on a personal computer.

2. Second Embodiment

Computer

The series of processes described above can be executed by hardware but can also be executed by software. When the series of processes is executed by software, a program that constructs such software is installed into a computer. Here, the expression "computer" includes a computer in which dedicated hardware is incorporated and a general-purpose personal computer or the like that is capable of executing various functions when various programs are installed.

Figure 8:
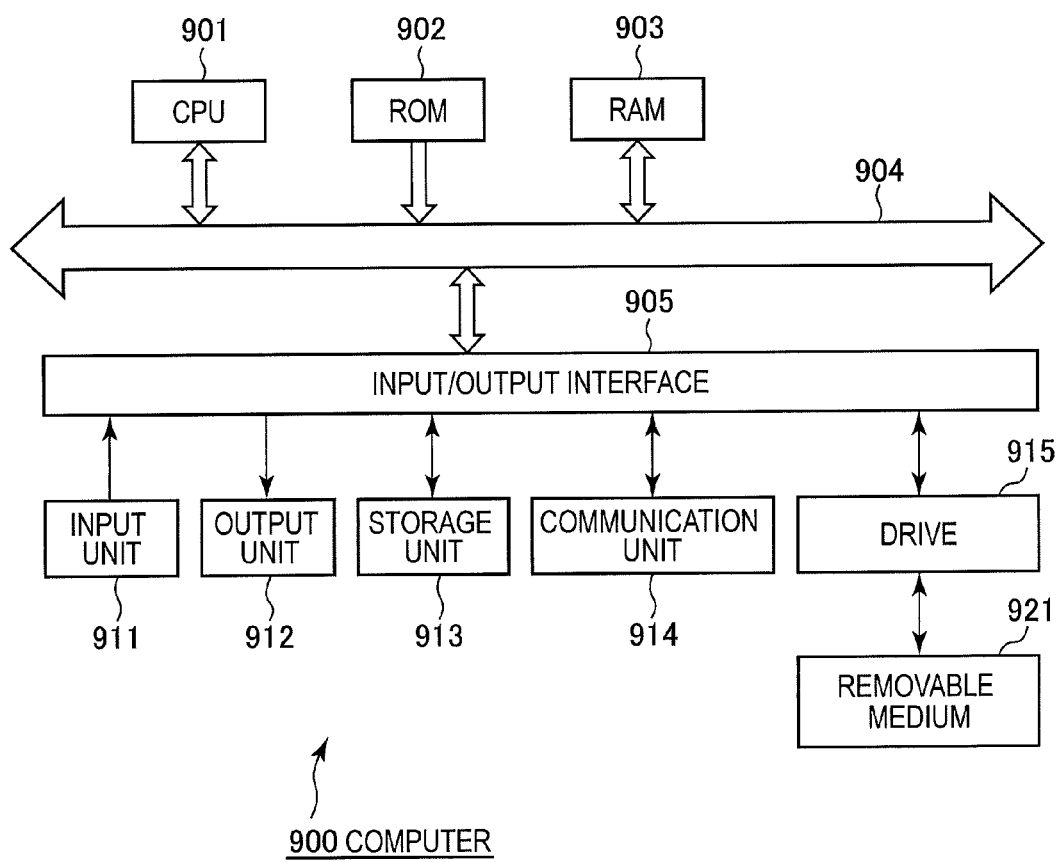
FIG. 8 is a block diagram illustrating an exemplary primary configuration of a computer.

FIG. 8 is a block diagram showing an example configuration of the hardware of a computer that executes the series of processes described earlier according to a program.

In the computer 900 shown in FIG. 8, a CUP (Central Processing Unit) 901, a ROM (Read Only Memory) 902 and a RAM (Random Access Memory) 903 are mutually connected by a bus 904.

An input/output interface 910 is also connected to the bus 904. An input unit 911, an output unit 912, a storage unit 913, a communication unit 914, and a drive 915 are connected to the input/output interface 910.

The input unit 911 is configured from a keyboard, a mouse, a microphone, a touch panel, an input terminal or the like. The output unit 912 is configured from a display, a speaker, an output terminal or the like. The storage unit 913 is configured from a hard disk, a RAM disk, a non-volatile memory or the like. The communication unit 914 is configured from a network interface or the like. The drive 915 drives a removable media 921 such as a magnetic disk, an optical disk, a magneto-optical disk, a semiconductor memory or the like.

In the computer configured as described above, the CPU 901 loads a program that is stored, for example, in the storage unit 913 onto the RAM 903 via the input/output interface 910 and the bus 904, and executes the program. Thus, the above-described series of processing is performed. The RAM 903 also properly stores data necessary for the CPU 901 to execute various processing.

Programs to be executed by the computer (the CPU 901) are applied being recorded in the removable media 921 which is a packaged media or the like. Also, programs may be provided via a wired or wireless transmission medium, such as a local area network, the Internet or digital satellite broadcasting.

In the computer, by loading the removable recording medium 921 into the drive 915, the program can be installed into the storage unit 913 via the input/output interface 910. It is also possible to receive the program from a wired or wireless transfer medium using the communication unit 914 and install the program into the storage unit 913. As another alternative, the program can be installed in advance into the ROM 902 or the storage unit 913.

It should be noted that the program executed by a computer may be a program that is processed in time series according to the sequence described in this specification or a program that is processed in parallel or at necessary timing such as upon calling.

It should be also noted that, in this specification, the steps describing the program stored in the recording medium include not only a process performed in time series according to the sequence shown therein but also a process executed in parallel or individually, not necessarily performed in time series.

Further, in the present disclosure, a system has the meaning of a set of a plurality of configured elements (such as an apparatus or a module (part)), and does not take into account whether or not all the configured elements are in the same casing. Therefore, the system may be either a plurality of apparatuses, stored in separate casings and connected through a network, or a plurality of modules within a single casing.

Further, an element described as a single device (or processing unit) above may be configured as a plurality of devices (or processing units). On the contrary, elements described as a plurality of devices (or processing units) above may be configured collectively as a single device (or processing unit). Further, an element other than those described above may be added to each device (or processing unit). Furthermore, a part of an element of a given device (or processing unit) may be included in an element of another device (or another processing unit) as long as the configuration or operation of the system as a whole is substantially the same.

It should be understood by those skilled in the art that various modifications, combinations, sub-combinations and alterations may occur depending on design requirements and other factors insofar as they are within the scope of the appended claims or the equivalents thereof.

For example, the present disclosure can adopt a configuration of cloud computing which processes by allocating and connecting one function by a plurality of apparatuses through a network.

Further, each step described by the above mentioned flow charts can be executed by one apparatus or by allocating a plurality of apparatuses.

In addition, in the case where a plurality of processes is included in one step, the plurality of processes included in this one step can be executed by one apparatus or by allocating a plurality of apparatuses.

Additionally, the present application may also be configured as below.

(1) An image processing apparatus including:
a tone mapper that losslessly tone maps image data in a floating-point representation;
a base layer generator that generates base layer image data by reducing a bit depth of the image data tone mapped by the tone mapper; and
an enhancement layer generator that generates enhancement layer data by using the image data tone mapped by the tone mapper and the base layer image data generated by the base layer generator.

(2) The image processing apparatus according to (1), wherein
the tone mapper tone maps the image data in a floating-point representation with a lossless logarithmic mapping.

(3) The image processing apparatus according to (2), wherein
the tone mapper tone maps the image data in a floating-point representation by multiplying a differential value between an exponent of the image data in a floating-point representation and a minimum value of the exponent by 2 to a power of a bit depth of a mantissa of the image data in a floating-point representation, and further adds the mantissa of the image data in a floating-point representation to a result of the multiplication.

(4) The image processing apparatus according to (3), wherein the base layer generator includes
a first computing unit that subjects the image data tone mapped by the tone mapper to calculation by 2 to a power of a negative of an absolute value of the bit depth of the base layer image data, and
a rounding unit that generates the base layer image data by discarding a fractional part of the image data subjected to the power of 2 multiplication by the first computing unit.

(5) The image processing apparatus according to (4), wherein
the first computing unit bitshifts a pixel value in the image data tone mapped by the tone mapper to a right by an amount equivalent to the bit depth of the base layer image data.

(6) The image processing apparatus according to (4) or (5), wherein the enhancement layer generator includes a second computing unit that subjects the base layer image data to calculation by 2 to a power of the bit depth of the base layer image data, and a differential data generator that generates differential data between the image data tone mapped by the tone mapper and the base layer image data subjected to the power of 2 calculation by the second computing unit.

(7) The image processing apparatus according to (6), wherein the second computing unit bitshifts a pixel value in the base layer image data to a left by an amount equivalent to the bit depth of the base layer image data.

(8) The image processing apparatus according to any one of (1) to (7), further including:

a base layer encoder that encodes the base layer image data generated by the base layer generator.

(9) The image processing apparatus according to any one of (1) to (8), further including:

an enhancement layer encoder that encodes the enhancement layer data generated by the enhancement layer generator.

(10) An image processing method for an image processing apparatus, the image processing apparatus losslessly tone mapping image data in a floating-point representation, generating base layer image data by reducing a bit depth of the tone mapped image data, generating enhancement layer data by using the tone mapped image data and the generated base layer image data.

(11) A program for causing a computer to function as:

a tone mapper that losslessly tone maps image data in a floating-point representation;

a base layer generator that generates base layer image data by reducing a bit depth of the image data tone mapped by the tone mapper; and an enhancement layer generator that generates enhancement layer data by using the image data tone mapped by the tone mapper and the base layer image data generated by the base layer generator.

(12) An image processing apparatus including:

an image data generator that generates tone mapped image data by using enhancement layer data and base layer image data, the enhancement layer data having been generated using image data obtained by tone mapping image data in a floating-point representation and the base layer image data having been generated from the tone mapped image data; and an inverse tone mapper that generates image data in a floating-point representation by applying a lossless inverse tone mapping to the tone mapped image data generated by the image data generator.

(13) The image processing apparatus according to (12), wherein the inverse tone mapper generates the image data in a floating-point representation with a lossless inverse logarithmic mapping.

(14) The image processing apparatus according to (13), wherein the image data generator includes a computing unit that subjects the base layer image data to calculation by 2 to a power of a bit depth of the base layer image data, and an adder that generates the tone mapped image data by adding the base layer image data subjected to the power of 2 calculation by the computing unit to the enhancement layer data.

(15) The image processing apparatus according to (14), wherein the computing unit bitshifts a pixel value in the base layer image data to a left by an amount equivalent to the bit depth of the base layer image data.

(16) The image processing apparatus according to any one of (12) to (15), further including:

a base layer decoder that decodes encoded data of the base layer image data;

wherein the image data generator generates the tone mapped image data by using the base layer image data obtained by the base layer decoder.

(17) The image processing apparatus according to any one of (12) to (16), further including:

an enhancement layer decoder that decodes encoded data of the enhancement layer data;

wherein the image data generator generates the tone mapped image data by using the enhancement layer data obtained by the enhancement layer decoder.

(18) The image processing apparatus according to any one of (12) to (15), further including:

a receiver that receives encoding-related information;

a base layer decoder that decodes encoded data of the base layer image data in a format that corresponds to an encoding format specified by the encoding-related information received by the receiver; and an enhancement layer decoder that decodes encoded data of the enhancement layer data in a format that corresponds to an encoding format specified by the encoding-related information received by the receiver.

(19) An image processing method for an image processing apparatus, the image processing apparatus generating tone mapped image data by using enhancement layer data and base layer image data, the enhancement layer data having been generated using image data obtained by tone mapping image data in a floating-point representation and the base layer image data having been generated from the tone mapped image data, generating image data in a floating-point representation by applying a lossless inverse tone mapping to the generated tone mapped image data.

(20) A program for causing a computer to function as:

an image data generator that generates tone mapped image data by using enhancement layer data and base layer image data, the enhancement layer data having been generated using image data obtained by tone mapping image data in a floating-point representation and the base layer image data having been generated from the tone mapped image data; and an inverse tone mapper that generates image data in a floating-point representation by applying a lossless inverse tone mapping to the tone mapped image data generated by the image data generator.

The present disclosure contains subject matter related to that disclosed in Japanese Priority Patent Application JP 2012-130913 filed in the Japan Patent Office on Jun. 8, 2012, the entire content of which is hereby incorporated by reference.

What is claimed is:

1. An image processing apparatus comprising:
    an image data generator that generates tone mapped image data by using enhancement layer data and base layer image data, the enhancement layer data having been generated using image data obtained by tone mapping image data in a floating-point representation and the base layer image data having been generated from the tone mapped image data, the image data generator including a computing unit that subjects the base layer image data to calculation by 2 to a power of a bit depth of the base layer image data, and an adder that generates the tone mapped image data by adding the base layer image data subjected to the power of 2 calculation by the computing unit to the enhancement layer data; and an inverse tone mapper that generates image data in a floating-point representation with a lossless inverse logarithmic mapping by applying a lossless inverse tone mapping to the tone mapped image data generated by the image data generator.

2. The image processing apparatus according to claim 1, wherein the computing unit bitshifts a pixel value in the base layer image data to a left by an amount equivalent to the bit depth of the base layer image data.

3. The image processing apparatus according to claim 1, further comprising:

a base layer decoder that decodes encoded data of the base layer image data;

wherein the image data generator generates the tone mapped image data by using the base layer image data obtained by the base layer decoder.

4. The image processing apparatus according to claim 1, further comprising:

an enhancement layer decoder that decodes encoded data of the enhancement layer data;

wherein the image data generator generates the tone mapped image data by using the enhancement layer data obtained by the enhancement layer decoder.

5. The image processing apparatus according to claim 1, further comprising:

a receiver that receives encoding-related information;

a base layer decoder that decodes encoded data of the base layer image data in a format that corresponds to an encoding format specified by the encoding-related information received by the receiver; and an enhancement layer decoder that decodes encoded data of the enhancement layer data in a format that corresponds to an encoding format specified by the encoding-related information received by the receiver.

6. An image processing method for an image processing apparatus, the image processing apparatus generating tone mapped image data by using enhancement layer data and base layer image data, subjecting the base layer image data to calculation by 2 to a power of a bit depth of the base layer image data, the enhancement layer data having been generated using image data obtained by tone mapping image data in a floating-point representation by adding the base layer image data subjected to the power of 2 calculation to the enhancement layer data, the base layer image data having been generated from the tone mapped image data, generating image data in a floating-point representation with a lossless inverse logarithmic mapping by applying a lossless inverse tone mapping to the generated tone mapped image data.

7. A program recorded on a non-transitory computer readable medium for causing a computer to function as:

an image data generator that generates tone mapped image data by using enhancement layer data and base layer image data, the enhancement layer data having been generated using image data obtained by tone mapping image data in a floating-point representation and the base layer image data having been generated from the tone mapped image data, the image data generator including a computing unit that subjects the base layer image data to calculation by 2 to a power of a bit depth of the base layer image data, and an adder that generates the tone mapped image data by adding the base layer image data subjected to the power of 2 calculation by the computing unit to the enhancement layer data; and an inverse tone mapper that generates image data in a floating-point representation with a lossless inverse logarithmic mapping by applying a lossless inverse tone mapping to the tone mapped image data generated by the image data generator.

* * * * *